July 7, 1931.  F. H. LEE  1,813,861
HAT CONSTRUCTION AND ART OF MAKING THE SAME
Filed March 13, 1931    5 Sheets-Sheet 1
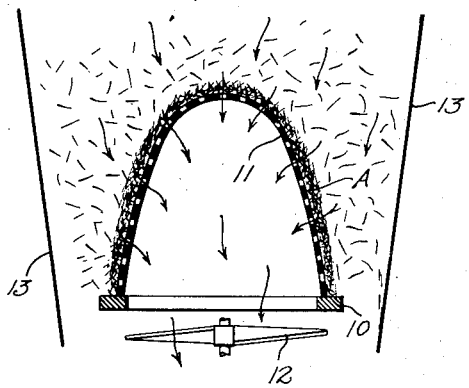
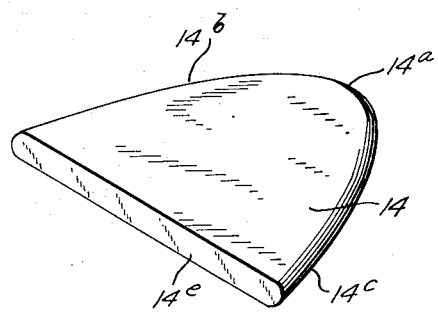
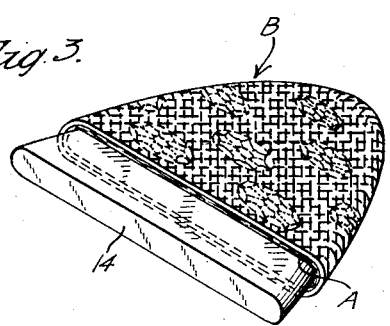
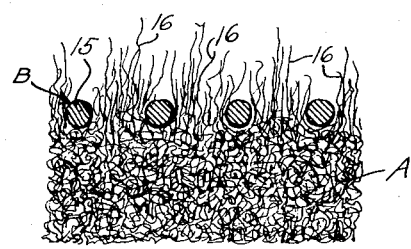
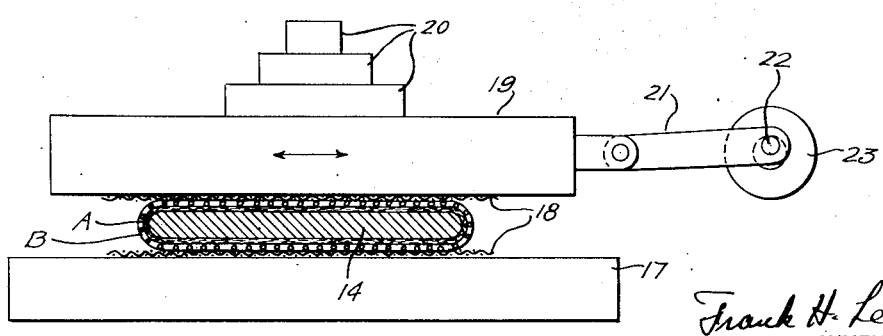
Frank H. Lee
INVENTOR.
BY Janney, Blair & Curtis
ATTORNEYS Frank H. Lee
INVENTOR BY Janney, Blair & Curtis
ATTORNEYS July 7, 1931. F. H. LEE 1,813,861
HAT CONSTRUCTION AND ART OF MAKING THE SAME
Filed March 13, 1931 5 Sheets-Sheet 3

Frank H. Lee
INVENTOR.

BY Janney, Blair & Curtis
ATTORNEYS

July 7, 1931.    F. H. LEE    1,813,861
HAT CONSTRUCTION AND ART OF MAKING THE SAME
Filed March 13, 1931    5 Sheets-Sheet 4

Frank H. Lee
INVENTOR.

BY Janney, Blair & Curtis
ATTORNEYS

July 7, 1931.  F. H. LEE  1,813,861
HAT CONSTRUCTION AND ART OF MAKING THE SAME
Filed March 13, 1931   5 Sheets-Sheet 5

Frank H. Lee
INVENTOR

BY Janney, Blair & Curtis
ATTORNEYS

Patented July 7, 1931

1,813,861

UNITED STATES PATENT OFFICE

FRANK H. LEE, OF DANBURY, CONNECTICUT

HAT CONSTRUCTION AND ART OF MAKING THE SAME

Application filed March 13, 1931. Serial No. 522,338.

This invention relates to hat construction and to the art of making the same.

One of the objects of this invention is to provide a simple and practical method of making strong, durable and ornamented hats. Another object is to provide a method of making decorative hats that may be readily and inexpensively carried on in practice. Another object is to provide a dependable and practical method of making hats out of materials each having qualities or characteristics not inherent in the other and which in combination gives certain highly desirable and heretofore never achieved qualities and advantages to the hat, such as a wide variety of decorative effects, a wide variety of colors and/or color contrasts, and the like. Another object is to provide a dependable method that may be readily carried on in practice for dependably and reliably making available, in the ultimate hat, of materials such as fancy open-work or woven materials, lace, or the like, whose physical or mechanical characteristics are antagonistic to the methods heretofore employed in the construction of hats. Another object is to provide a reliable and commercially practical method of making hats out of a composite fabric of felt and open-work or loosely woven silks, linen, or the like.

Another object is to provide a durable and practical hat of attractive and ornamental or decorative appearance. Another object is to provide a practical hat in which fancy or highly decorative effects may be inexpensively achieved, all without detracting from the achievement of strength and high quality of product. Another object is to provide a hat construction of the above-mentioned character in which attractive coloring and/or color contrasts and/or color schemes may be inexpensively achieved. Another object is to provide a hat construction of the above-mentioned nature that will be well adapted to meet the varying conditions of hard practical use.

Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which are shown several of the various possible embodiments of certain mechanical features of my invention,

Figure 1 is a diagrammatic representation of an apparatus for achieving one step of one possible embodiment of my process;

Figure 2 is a perspective view of a form for use in subsequent steps of my process;

Figure 3 is a perspective view showing the form of Figure 2 with a hat body and certain other material related thereto;

Figure 4 is a fragmentary cross-sectional view on an exaggerated scale of the fabric in one stage of my process;

Figure 5 is a diagrammatic representation of a possible form of apparatus for carrying out certain later steps of my process;

Figure 6:
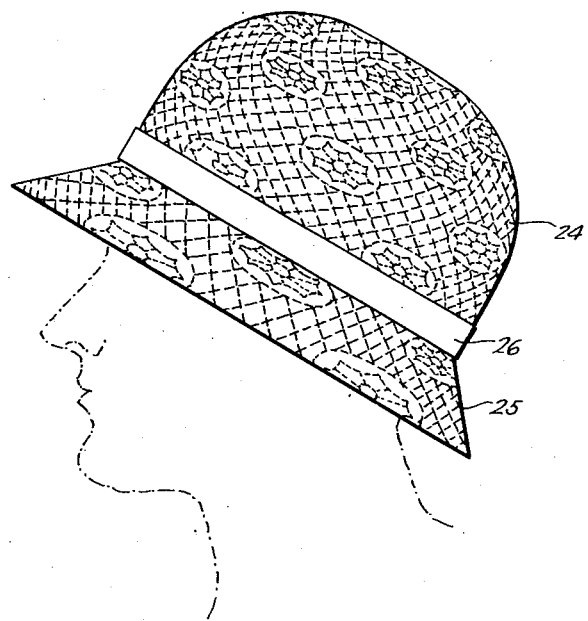
Figure 6 is a side elevation of a completed or finished hat body.

Similar reference characters refer to similar parts throughout the several views of the drawings.

Figure 7:
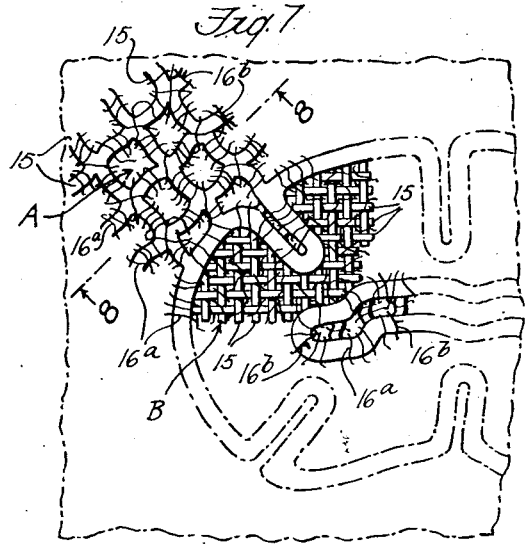
Figure 7 is a fragmentary plan view on an exaggerated scale of a portion of the hat of Figure 6.

Considering first one embodiment of my process, after suitably preparing suitable fur fibers for felting, as by carroting, I form out of such feltable fur fibers a hat bat preferably in the form substantially of a cone, and for this purpose I may use an apparatus like that diagrammatically indicated in Figure 7.

This apparatus may comprise a suitable slowly rotating annular support 10 upon which rests a sheet metal cone 11, suitably perforated so that a fan 12, positioned underneath the cone may draw air downwardly through the many and relatively small perforations in the cone 11, as indicated by the arrows in Figure 1. The apparatus may be enclosed in a suitable chamber indicated at 13 and into the upper portion of the latter there are scattered or thrown, as by the use of rapidly rotating picker rolls, the thus prepared feltable fur fibers. These fur fibers are caught up by the down draft of air and are laid uniformly upon and against the outer surface of the cone 11, thus to form a conical hat bat indicated in Figure 1 at A.

After the requisite quantity of fur fibers have thus been deposited onto the cone 11, the latter with the hat bat A still thereon is wrapped in suitable cloths, removed from the apparatus and dipped in water of suitable temperature, thus to cause the deposited fur fibers to adhere sufficiently to permit the hat bat A to be removed from the cone 11.

The hat bat A is thereupon partially "hardened", preferably by subjecting it to relatively gentle kneading accompanied by frequent application of steam or hot water or both; thus to interfelt the feltable fibers sufficiently to give the hat bat adequate mechanical strength to withstand the subsequent steps.

I then provide a flat form indicated at 14 in Figure 2, this form being shaped, generally triangularly, to fit into the hat bat A when the later is laid down flatwise on its side, as distinguished from the otherwise conical shape that it had while still on the forming cone 11 of Figure 1. Hence the form 14, which may be made of preferably canvas, or any other suitable material, is rounded at its one apex, as indicated at 14ª, while its side portions 14ᵇ and 14ᶜ are rounded over in cross-section, as clearly appears from the shape of the base portion 14ᵉ of the form 14.

The bat A is thereupon slipped or fitted over the form 14 (see now Figure 3).

I then form into the shape of a cone of substantially the same size as the hat bat A a body B made up of interengaged or interlooped threads or yarn, the fibers of which may be of any suitable material, such as cotton, linen, silk, rayon, or the like, and the threads or yarn of which have adequate interstices therebetween, achieved either by weaving the material of the body B loosely enough or by making the material of openwork construction, such as is characteristic of lace, for example. The fibers of the threads or yarn of the body B and a good example of which is lace or silk or rayon are substantially devoid of felting properties and are substantially non-feltable but the threads which they make up lend themselves to the production by weaving, knitting, or the like, of ornamentations, designs, or the like, of which the felt bat A itself is incapable. The body B, made of these above-mentioned fibers, may be given the cone shape above-mentioned in any suitable way, as by weaving, for example, and the body B is slipped or fitted over the hat bat A after the latter, as above noted, has been fitted over the form 14. The parts thus related are shown in perspective in Figure 3. This open-work body B is then carefully smoothed down into thorough contact with the partially hardened hat bat A.

Though the hardening step to which the hat bat A has been subjected and which may be carried on by hand or by machine brings about what may be termed an incomplete or loose interlocking or interfelting of the fur fibers one with the other, the latter nevertheless has fur fibers loose enough so that, when the open-work body B and the felt bat A are interrelated to each other as above described, certain of such fibers can be worked into and through the interstices between the threads or yarn in the body B.

In Figure 4 I have shown in exaggerated cross-section the felt bat A with the open-work body B related to it, Figure 4 showing certain of the threads or yarn, indicated at 15, of the body B in cross-section with the interstices therebetween. Through these interstices feltable fur fibers project or can be made to project; certain of these projected fur fibers are indicated at 16 in Figure 4. Moreover, the feltable fur fibers of the bat A may be of varying lengths, some of them being as long as one-half or three-quarters of an inch.

I thereupon subject the thus assembled hat bat A and the body B to a vibratory treatment under pressure in order to bring about certain actions about to be pointed out, and this treatment is preferably carried on with the parts A and B upon the form 14. The assemblage indicated in perspective in Figure 3 I then place upon a support 17 (see Figure 5), preferably with a cloth 18, which may be of cotton sheeting, interposed therebetween, and bring down upon the upper flat surface of this assemblage a plate-like member 19, interposing between the latter and the assemblage a cloth 18.

Member 19 is constructed or mounted in any suitable manner to exert a downward pressure and to be movable, preferably with a relatively short stroke and at a relatively high speed, in the direction of its own plane. Conveniently, the plate member 19 may of itself be made heavy enough to exert the requisite pressure and with the aid of weights indicated at 20 I may vary this pressure to meet various conditions. The vibratory motion may be transmitted to the member 19 in any suitable manner, and I have diagrammatically indicated in Figure 5 a connecting rod 21 operated by a crank pin 22, preferably of variable stroke, driven by a suitable driven or rotating member 23.

The relation of the hat bat A and the form or body B as they are disposed in the apparatus of Figure 5 is substantially that indicated in exaggerated cross-section in Figure 4 and as the reciprocating or vibrating action under pressure proceeds, the hat bat A and the body B having previously been thoroughly steamed so that sufficient moisture and heat penetrate to the feltable fibers of the hat bat A, the feltable fibers of the hat bat A are more and more tightly interfelted and at the same time the fur fibers 16 (see Figure 4) that project through the interstices in the material or body B are laid over the threads 15 and worked back into the felt of the bat A. This action is probably facilitated by reason of the fact that the threads 15 of the body B are pressed to some extent into the felt of the bat A. Also, during this treatment, more fibers are brought up through the interstices in the body B and in a similar manner are made to loop over the threads 15 and to be forced back into the mass of fur fibers constituting the felt body of the bat A and to be interfelted with these fur fibers. These actions are accompanied by a tightening up of the felt fibers of the hat bat A so that the fibers that loop over the threads 15 are made to have both of their otherwise free ends tightly interlocked or interfelted with the felt of the bat A. In effect, this vibratory treatment under pressure causes the body B to be securely tied down to the felt bat A by having individual threads of the former tied by individual fibers of the latter.

Figure 8:
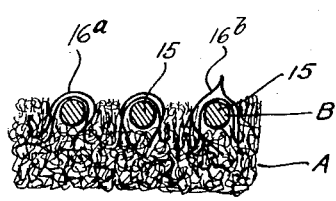
Figure 8 is a fragmentary cross-sectional view on an exaggerated scale through a portion of the hat body and may be considered as a sectional view along the line 8—8 of Figure 7.

In Figure 8 I have shown on an exaggerated scale how the fur fibers 16 are looped over individual threads 15 of the body B and have their two ends anchored into the fibers of the bat A with which they are interfelted. During this treatment also certain of the fibers that project through the interstices in the body B and which may, for example, be too short or may for other reasons be prevented from partaking in this complete looping or tying action, become interlocked or interfelted at their free ends and in Figure 8 I have shown, again exaggerated, how fibers 16$^b$, anchored in the hat bat A, are interfelted or interengaged at their free ends and together form a loop for tying a thread 15 of the form B down to the bat A.

As this treatment proceeds, the hardening of the bat A is completed if the bat A was initially only partially hardened, and the felt of the bat A is compacted because of the tightening up of the feltable fibers thereof and the felting action that proceeds, the thickness of the bat A being in effect reduced. The parts A and B of Figure 5, during this treatment, may gradually creep around the form 14 so that all portions of the parts A and B become subjected to this treatment, or, if such creeping action is inadequate or undesirable, the treatment, where it is carried on by an apparatus like that of Figure 5, may be interrupted and the bat A with the body B thereon shifted about the form 14 so that those portions thereof that are adjacent the sides 14$^b$ and 14$^c$ (Figure 2) of the form 14 are made to rest against the two flat faces of the form 14, in order to insure that all parts of the hat body receive this treatment.

The hat body A—B is then removed from the apparatus of Figure 5 and from the form 14. It is then subjected to shrinking either by machine or by hand to complete the felting together of the feltable fibers; this may be achieved in any suitable manner, as by subjecting the hat body, or several at a time with suitable cloths interposed therebetween, to an appropriate kneading action accompanied by applications of either steam or hot water or both, the kneading action being brought about either by hand or by machine. The felt of the hat bat A is thus further and completely compacted or tightened up and the looping and tying action of the fibers that secure the body B to the bat A also completed or tightened up. During these actions, it is probable also that additional fibers are worked out of the bat A and through interstices in the figured or open-work body B and made to tie threads of the latter down to the felt bat A.

The above-described kneading action is accompanied by shrinkage in the dimensions (height and diameter) of the cone-shaped hat body, but such shrinkage of the hat bat A is uniformly followed by a contraction and shrinkage of the open-work body B, whose open-work character facilitates this action without disfiguring any design which it may have.

The resultant cone-shaped hat body is thereupon stretched or blocked to bring out into final form the ultimate shape of the crown and the ultimate shape of the brim and in Figure 6 I have shown in side elevation a finished hat body with the crown 24 and brim 25 appropriately shaped. Any suitable means or apparatus such, for example, as is now employed in stretching, blocking, and flanging felt hat bodies, may be used for this purpose, the body B (Figure 3) yielding to these treatments while the fur felt body or bat A insuring the retention, by the figured or open-work or woven material of the body B, of the ultimate or final form of shape.

In Figure 7 is shown on exaggerated scale a portion of the hat body of Figure 6 in which the material of the body B (Figure 3) is in the form of a lace, Figure 7 thus illustrating a preferred form of open-work or loosely woven material that provides adequate interstices between the threads or yarn thereof. In Figure 7 certain of the interstices between the threads 15 plainly appear and through these interstices can be seen the felt hat body A, certain of the fibers of which project through the interstices, loop over the threads 15, and are felted back into the felt hat body A. Some of these fibers are indicated at 16.

The hat body 24—25 of Figure 6 may be "trimmed" in any desired or usual manner, as, for example, by applying a suitable band 26 to the exterior thereof and by applying a suitable lining, sweatband, or the like (not shown), upon the interior thereof.

It is possible that certain fibers may remain protruding or projecting from that side of the hat body on which the open-work body B appears and in such case these fibers may be clipped off at any suitable stage. Also, the hat body may be ironed or pressed or otherwise have its material and surface smoothed out.

As illustrative of, but not by way of limitation of my invention, certain possible other ways of carrying out certain steps of my invention, I may note that instead of forming a cone-shaped felt bat directly upon a perforated cone, as was described in connection with Figure 1, and thereafter applying a body B (Figure 3) of open-work or loosely woven material, I may proceed as is diagrammatically indicated in Figure 9, in which the cone 11, similar to the cone 11 of Figure 1, has first applied thereto the cone-shaped body B, and thereupon the felt hat bat A is formed thereon, the suction apparatus or fan 12 drawing the fur fibers directly down upon the body B. After a layer of sufficient thickness has thus been deposited the hat bat A is preferably partially hardened while still upon the cone 11, the latter being removed from the forming apparatus and being of sufficient mechanical strength to permit this partial hardening treatment to be performed. The hat body A—B is thereupon removed from the cone 11 and is mounted upon a form 14 (see Figure 2) whence the process proceeds as already described in connection with Figure 1.

Or, where it is desired that the ultimate hat have a woven material on both its inside and outside surfaces, I may proceed as above described in connection with Figure 9 and after having mounted the composite hat body upon the form 14 (see Figure 2) but with the open-work body upon the inside of the felt hat bat A, I may then mount upon the thus assembled parts an open-work body applied directly to the outer surface of the felt hat bat A, just as the loosely woven body B of Figure 3 was applied to the felt hat bat A of Figure 3. Thereafter, the process may be proceeded with as was described in connection with Figure 5.

Figure 9:
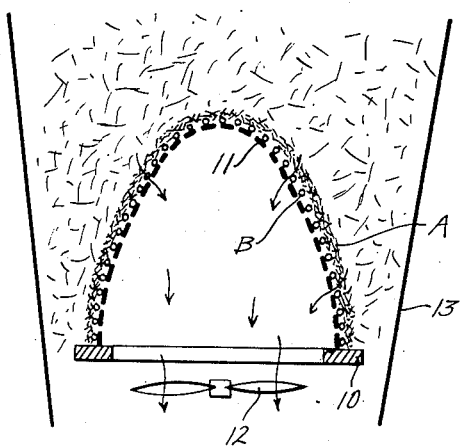
Figures 9 and 10 represent modifications of certain steps of my process.
Figure 10:
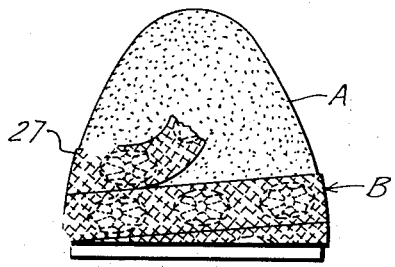

The body B of open-work material, such as lace, or the like, need not, however, be formed, woven, knitted, cut, or otherwise shaped into the form of a cone, but may, in the illustrative embodiments of either Figure 3 or Figure 9, take the form of a wrapping in strip form. In Figure 10 I have diagrammatically shown how the body B of Figure 3 or of Figure 9 may be built up of a strip 27 as by wrapping the strip 27 about the felt hat bat A whether the latter is still on the forming cone 11 or is upon the form 14 (Figures 2 and 3) or by wrapping the strip 27 directly upon the forming cone 11 of Figure 9, or by wrapping it directly upon the form 14 of Figures 2 and 3.

Figure 11:
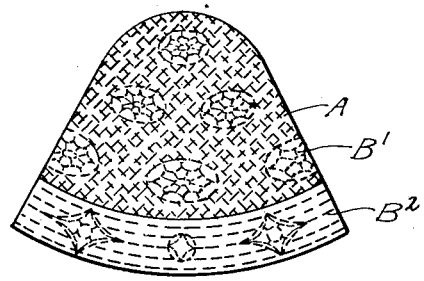
Figures 11, 12 and 13 show various possible combinations that may be effected.
Figure 12:
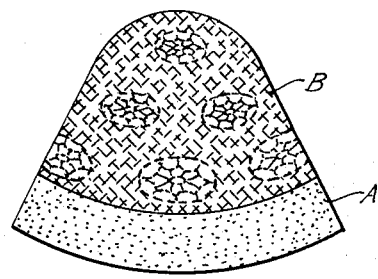
Figure 13:
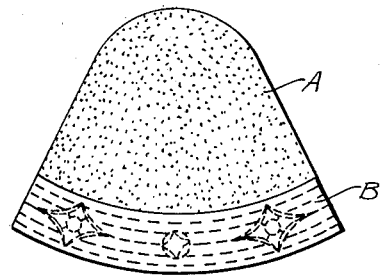

If, referring now to Figure 6, I wish to have the crown 24 covered and decorated by the open-work material and to have the brim 25 uncovered and hence with the fur felt exposed, or where, for example, I wish to have the crown 24 of the hat lined, I give the cone-shaped body B of the woven or open-work material a lesser height than that of the cone-shaped hat bat, as is indicated in Figure 12. Or, if I wish simply to decorate and cover either or both sides of only the brim 25 leaving the crown 24 (Figure 6) of plain felt, I give the body B the form of a truncated cone, as is indicated in Figure 13. Or, if I wish to contrast the designs or figures of the crown and brim, I relate to the felt hat bat A two open-work bodies $B^1$ and $B^2$ (see Figure 11), the former being in the form of a cone whose height is less than that of the felt hat bat A, and the latter being in the form of a truncated cone. In any of these cases, the steps of my process may be carried on as has already been described above in detail. The open-work bodies of Figures 11, 12 and 13 may be given the requisite shapes in any manner, even as by wrapping as in the strip form of Figure 10.

Figure 15:
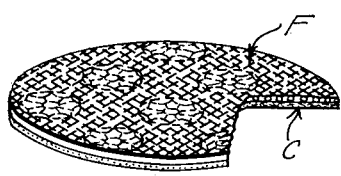
Figure 19:
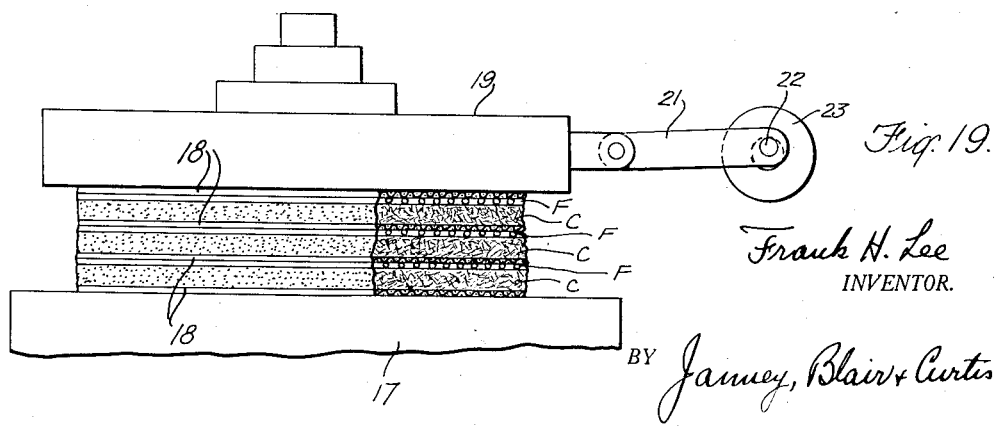
Figure 19 shows diagrammatically a possible other form of apparatus that may be used in certain steps of my process.

As further illustrative of other possible steps in carrying out my process, I may first proceed as described above in connection with Figure 1, forming first a cone-shaped hat bat, preferably on a forming cone that is of relatively low height. This hat bat, after dipping and hardening or partial hardening, is then stretched out into the form of a flat disk, as is indicated in perspective at C in Figure 15. To this flat disk I apply to either one or both of its faces, a disk-shaped piece F of open-work or loosely woven material, as is shown in Figure 15, resulting in a structure which in cross-section is substantially like that shown in Figure 4. This assemblage C—F I then subject to the vibratory treatment under pressure, after steaming, with an apparatus like that of Figure 5. In Figure 19 I have shown three such assemblages C—F interposed between the plate members 17 and 19 of the apparatus, but with cloths 18 interposed therebetween and between the operating members of the apparatus. The actions that take place will now be clear in view of what has above been described in detail in connection with Figure 5.

After removing the disk-shaped bodies C—F from the apparatus of Figure 19, the felting of the feltable fibers is completed with results that will now be well understood, thereafter the disk-like hat body is stretched into a shape approximating a combined crown and brim, is blocked, and may be otherwise treated with apparatus and in a manner that is now used in the making of felt hats from disk-like bodies.

Figure 14:
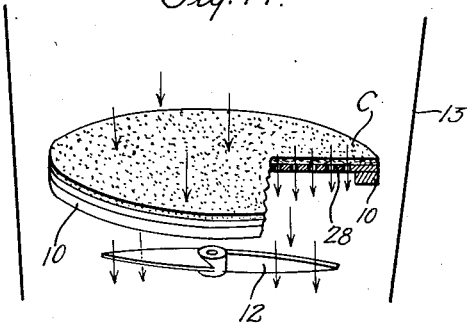
Figure 14 shows diagrammatically a possible other form of apparatus that may be used in certain steps of my process.

Instead of first forming a cone-shaped hat bat and then stretching it out into the flat disk-like body C of Figure 15, I may form the feltable fibers directly into a disk-like body by using an apparatus such as is diagrammatically indicated in Figure 14. That apparatus is substantially the same as that described in connection with Figure 1, excepting that the rotatable ring support 10 carries a flat disk-like perforated sheet metal forming disk 28 upon which the fur fibers are directly deposited to form a layer of the desired thickness. Then the open-work material F may be placed upon the body C and, with the aid of suitable cloths, the forming disk 28 with the parts carried thereby is dipped, the hat body C—F removed therefrom, hardened or partially hardened, whence the subsequent steps immediately above-described may be proceeded with.

Or I may first lay upon the forming disk 28 of Figure 14 the open-work or loosely woven body F and deposit directly upon the latter the layer of feltable fibers to form the hat bat C, removing the parts F—C from the disk 28 with the aid of cloths after dipping. Then again, hardening or partial hardening may be proceeded with and the subsequent steps that will now be clear carried on.

Figure 16:
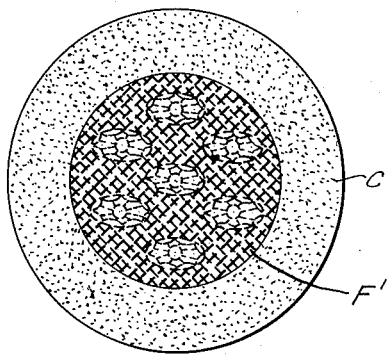
Figures 15, 16, 17 and 18 represent various possible combinations that may be effected.
Figure 17:
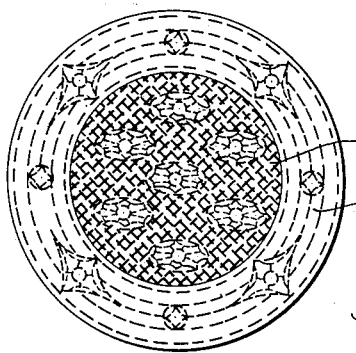
Figure 18:
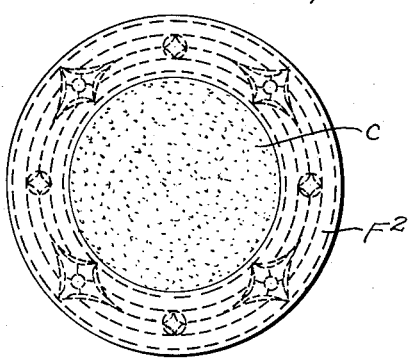

If it is desired to cover or decorate only the crown 24 of the hat (Figure 6) the open-work body F is given a smaller diameter than the disk-shaped hat body C, as is indicated at $F^1$ in Figure 16. Or if it is desired to contrast the coverings or decorations of the brim and crown, a disk-shaped body $F^1$ and a ring-shaped body $F^2$, the one fitting within the other, are related to the felt hat bat C, as is shown in Figure 17. The open-work portions $F^1$, $F^2$ of Figures 16, 17 and 18 and the disk-shaped felt hat bat C may be related to each other either by forming the latter upon the former or by assembling the open-work material to the already formed hat bat, as was described in connection with Figure 15. The subsequent steps of my process proceed as was described above in connection with Figures 15 and 19.

Figure 20:
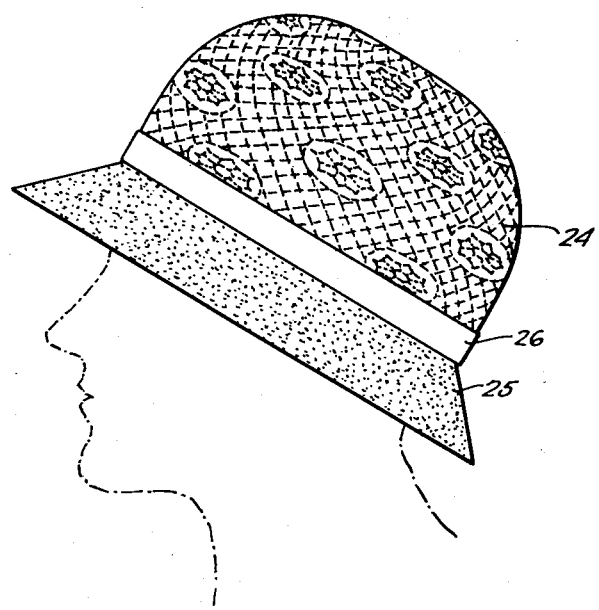
Figure 20 is a side elevation of a completed hat illustrating one combination or effect.
Figure 21:
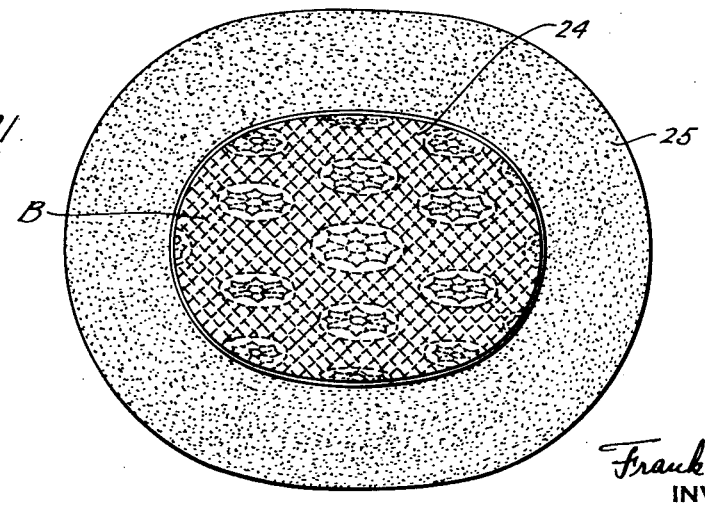
Figure 21 is a plan view looking into a finished hat and showing another effect that may be attained.

In Figure 19 is shown in side elevation a completed hat body in which the crown 24 is covered or decorated and the brim 25 is left plain, to illustrate certain features of the hat body that results from proceeding as is indicated in Figure 12 or in Figure 16. In Figure 20 which is a view looking into the interior of a finished hat body, the crown 24 is shown lined with the open-work material B which is thus made to function as a hat lining and as a result of which a separate lining need not be employed.

Furthermore, according to my process, I am enabled to achieve a great variety of attractive or contrasting color schemes, thus making it possible to arrive at an ornamentation that adds to the ornamentation provided by the applied open-work material which, as illustratively above-mentioned, may take the form of lace which may be figured in a vast variety of designs and the like. For example, I may dye the material of the body B or of the body F above-described, giving it any desired color before it and the felt hat bat or felt hat body are related to each other, giving in turn the felt hat body A or C any desired color by dyeing or utilizing any of the various possible available natural colors of the feltable fibers themselves. Thus, I am enabled to produce in the final hat body a wide variety of color schemes or contrasts.

Or, by way of further illustration, I may dye the open-work material before it and the felt hat body are related to each other, giving the material of the bodies B or F one shade or color, and then in any subsequent step of the process described above, I dye the resultant hat body with another color, this last step of dyeing causing different reactions in the felt portion of the hat body from what it causes in the already dyed open-work material.

Also, I may treat the open-work material before it is related to the felt in any suitable way to resist to any desired extent the dye to which the hat body is subjected in any of the above-described steps of my process, thus achieving another range of possible color schemes. Or I may choose for the open-work material a substance or fiber which is inherently resistant to dyes to which the felt itself is not resistant; for example, I may in any of the latter stages of my process employ an acid dye for dyeing the composite hat body while utilizing for the bodies B and F a material made of a fiber like rayon, that is resistant to acid dyes; in this way I am enabled to arrive at still another range of possible color contrasts or schemes. In the latter case the open-work material may be pre-dyed or not as desired.

The various contrasts or color schemes above-described are, according to another feature of my invention, susceptible of still further possible variations; for example, I may wish to have the design or figure of the open-work body B appear more or less prominently in the ultimate hat and this I may achieve by varying at will the number of looping or securing feltable fibers that engage the threads of the body B. Where, for example, I wish to have the design, particularly where it is of a highly ornamental character, appear prominently, I carry out the initial hardening step to which the felt hat bat is subjected to a greater extent than where I wish to have the design appear less prominently. In the former case, the greater extent of the initial hardening makes available fewer feltable fibers of the hat bat A for extending over the threads of the open-work body B, while in the latter case the lesser extent of the initial hardening step makes available more fibers for looping over or extending over the threads of the open-work body B with corresponding changes in the prominence of the design of the latter.

It might also be noted at this point that the form 14 (Figures 2, 3 and 5) is preferably of a yieldable nature and this feature of its construction facilitates the actions above-described in connection with Figure 5. As above pointed out, also, the form 14 is preferably made of canvas, being built up of a suitable number of layers thereof.

Instead of using feltable fur fibers out of which to form the felt portion of the hat, I may employ wool; in the latter case, the various steps above-described in detail may be practiced, excepting that the formation of the felt hat bat, either in conical or flat form, is preferably achieved by forming the wool fibers into a layer in any manner suitable to achieve subsequent interfelting thereof and then relating the open-work material thereto, or I may form a layer of wool fibers directly upon the open-work material. Preferably, however, the wool fibers from a carding machine may be laid or deposited, as just described, by means of a so-called cross-forming machine.

It will thus be seen that there has been provided in this invention a hat construction and a method of hat manufacture in which the various objects hereinabove noted, together with many thoroughly practical advantages, are successfully achieved. The method of manufacture will be seen to be thoroughly practical and will be seen to achieve thoroughly reliable and dependable results. Also, the hat construction, aside from being of attractive appearance and aside from having a wide range of possibilities as to decoration is strong, durable and well adapted to meet the varying conditions of hard practical use.

As many possible embodiments may be made of the mechanical features of the above invention and as the art herein described might be varied in various parts, all without departing from the scope of the invention, it is to be understood that all matter hereinabove set forth or shown in the accompanying drawings, is to be interpreted as illustrative and not in a limiting sense.

I claim:

1. The herein described art of hat manufacture which consists in forming a cone-shaped layer of feltable fibers, relating thereto a cone-shaped material made of threads having interstices therebetween, felting the fibers of said layer together, looping certain of said fibers through said interstices and over the threads of said material and felting the otherwise free ends thereof into the layer of felt, and blocking the resultant hat body into the shape of a hat.

2. The herein described art of hat manufacture which consists in forming a layer of feltable fibers on to a cone-shaped support, covering the layer of felt fibers with a material made of threads having interstices therebetween, dipping the support with the layer of felting with the material thereon, removing the layer of felt with said material, felting said fibers together and looping certain of said fibers through interstices of said material and over the threads of the latter and felting the otherwise free ends of said certain fibers into the felt bat, and blocking the resultant cone-shaped hat body into the form of a hat.

3. The herein described art of hat manufacture which consists in forming a layer of feltable fibers on to a cone-shaped support, subjecting the cone-shaped layer to hardening action, covering the layer of felt fibers with a material made of threads having interstices therebetween, dipping the support with the layer of felt with the material thereon, removing the layer of felt with said material, causing certain fibers of said felt layer to engage over the threads of said material and to become interfelted with other fibers of said felt layer by subjecting the resultant cone-shaped hat body to a kneading action under the influence of heat and moisture, shrinking the hat body and shaping the hat body into the form of a hat.

4. The herein described art of hat manufacture which consists in forming a layer of feltable fibers on to a cone-shaped support, subjecting the cone-shaped layer to hardening action, covering the layer of felt fibers with a material made of threads having interstices therebetween, removing the resultant felt hat bat with the material thereon from the support, causing certain fibers of said felt layer to engage over the threads of said material and to become interfelted with other fibers of said felt layer by subjecting the composite hat body to kneading action under the influence of heat and moisture, shrinking the hat body and giving the hat body the shape of a hat.

5. The herein described art of hat manufacture which consists in placing a cone-shaped material made of threads having interstices therebetween upon a cone-shaped perforated forming surface, depositing a layer of feltable fibers upon said material, removing the resultant cone-shaped hat body from the perforated support, and felting the fibers of said layer together and looping certain fibers thereof through interstices in said material and over the threads of the latter and felting the otherwise free ends thereof into the felt layer.

6. The herein described art of hat manufacture which consists in placing a cone-shaped material made of threads having interstices therebetween upon a cone-shaped perforated forming surface, depositing a layer of feltable fibers upon said material, removing the resultant cone-shaped hat body from the perforated support, causing certain fibers of said felt layer to engage over the threads of said material and to become interfelted with other fibers of said felt layer by subjecting the resultant cone-shaped hat body to pressure between relatively vibratory supports, and giving the hat body the shape of a hat.

7. The herein described art of hat manufacture which consists in placing a cone-shaped material made of threads having interstices therebetween and whose fibers are incapable of felting upon a cone-shaped perforated forming surface, depositing a layer of feltable fibers upon said material, removing the resultant cone-shaped hat body from the perforated support, subjecting the resultant cone-shaped hat body to agitation to interfelt the fibers of said layer and to cause certain fibers thereof to secure said material to said layer, and giving the hat body the shape of a hat.

8. The herein described art of hat manufacture which consists in placing a cone-shaped material made of threads having interstices therebetween and whose fibers are incapable of felting upon a cone-shaped perforated forming surface, depositing a layer of feltable fibers upon said material, removing the resultant cone-shaped hat body from the perforated support, and working the resultant cone-shaped hat body to cause said feltable fibers to interfelt with each other and to cause certain of the feltable fibers to engage and hold the threads of said material.

9. The herein described art of hat manufacture which consists in placing a cone-shaped material made of threads having interstices therebetween and whose fibers are incapable of felting upon a cone-shaped perforated forming surface, depositing a layer of feltable fibers upon said material, removing the resultant cone-shaped hat body from the perforated support, partially hardening the cone-shaped hat bat, interfelting the fibers of the latter, and working certain of the fibers of the latter into securing engagement with the threads of said material.

10. The herein described art of hat manufacture which consists in forming a disk-like hat bat out of feltable fibers, relating thereto a disk-like sheet of material comprising woven threads of non-feltable fibers with interstices between threads, working the resultant disk-like hat body to cause the feltable fibers to interfelt with each other and to cause certain of the feltable fibers to work through interstices in said material and to loop over the threads of the latter and to interfelt with the feltable fibers, and stretching and blocking the resultant hat body into the shape of a hat.

11. The herein described art of hat manufacture which consists in forming a cone-shaped hat bat out of feltable fibers, shaping the hat bat into the form of a flat disk, relating thereto an open-work material, and felting the fibers of the hat bat together and looping certain of the fibers over threads of said material and interfelting the ends of said looped fibers with the fibers of the felt bat.

12. The herein described art of hat manufacture which consists in forming a cone-shaped hat bat out of feltable fibers, shaping the hat bat into the form of a flat disk, relating thereto an open-work material, felting the fibers of the hat bat together and looping certain of the fibers over threads of said material and interfelting the ends of said looped fibers with the fibers of the felt bat, and shaping the resultant composite disk-shaped hat body into the form of a hat.

13. The herein described art of hat manufacture which consists in forming a hat bat out of a layer of feltable fibers, relating thereto a loosely woven material made of fibers incapable of interfelting with said feltable fibers, subjecting the felt hat bat to hardening action, and completing the felting together of the fibers of the hat bat and utilizing certain fibers of the latter to directly secure the threads of said material to the hat bat.

14. The herein described art of hat manufacture which consists in forming a felt hat bat, relating thereto loosely woven materials of different appearances, one material corresponding to what is to be the crown of the hat and the other material corresponding to what is to be the brim of the hat, completing the felting together of the fibers of the felt hat bat, and causing certain of the feltable fibers to directly secure said materials to the felt hat bat.

15. The herein described art of hat manufacture which consists in forming a felt hat bat, relating thereto loosely woven non-feltable materials of different appearances, one material corresponding to what is to be the crown of the hat and the other material corresponding to what is to be the brim of the hat, and causing feltable fibers, interfelted with the felt hat bat, to directly secure said materials in place.

16. The herein described art of hat manufacture which consists in forming a hat bat out of feltable fibers, relating thereto a loosely woven material having interstices between the threads thereof, and whose threads are made of fibers incapable of interfelting with said feltable fibers, securing said material to the felt hat bat by feltable fibers of the hat bat felted into the latter, and giving the resultant hat body the shape of a hat.

17. The herein described art of hat manufacture which consists in forming a hat bat of feltable fibers, hardening the hat bat, relating thereto a loosely woven material, the threads of which are made of non-feltable fibers, continuing the hardening of the hat bat and working fibers of the latter over threads of said material and back into the hat bat to form loops for securing the material to the bat, shrinking the hat body, and blocking the hat body into the shape of a hat.

18. In hat construction, in combination, a hat-shaped felt body and a complementary hat-shaped body interfitted therewith and made of an open-work material made up of threads with interstices therebetween, the thread of said material being made of non-feltable fibers, and feltable fibers looped over threads of said material and having their ends interfelted in the felt hat body.

19. In hat construction, in combination, a hat-shaped felt body having at least a portion thereof covered with an open-work material made up of threads made of non-feltable fibers, certain of the feltable fibers of the felt body directly securing said material to the latter.

20. In hat construction, in combination, a hat-shaped felt body having at least a portion thereof covered with an open-work material made up of threads made of non-feltable fibers, certain of the feltable fibers of the felt body being looped over threads of said material and having their otherwise free ends interfelted with the fibers of the felt body.

21. In hat construction, in combination, a hat bat made of feltable fibers having at least a portion thereof covered with an open-work material secured to the bat by feltable fibers interfelted only with the fibers of the hat bat.

22. In hat construction, in combination, a hat bat made of feltable fibers having at least a portion thereof covered with an open-work material secured to the bat by fibers looping over threads of said material and having their ends interfelted with the fibers of the felt bat.

23. In hat construction, in combination, a hat bat made of interfelted feltable fibers having superimposed thereon an open-work material made of threads made of fibers incapable of interfelting with the feltable fibers of said hat bat, and means for holding said material in place comprising feltable fibers extending individually over the threads thereof and having their ends interfelted with the fibers of the hat bat.

24. In hat construction, in combination, a hat bat made of interfelted feltable fibers having superimposed thereon an open-work material made of threads made of fibers incapable of interfelting with the feltable fibers of said hat bat, certain of the fibers of the hat bat being looped over the threads of said material and having their ends interfelted with the fibers of the hat bat.

25. In hat construction, in combination, a hat body made of interfelted feltable fibers and having one color, and having secured thereto by the fibers of said hat body an open-work material, the threads of which are made of non-feltable fiber, and having a different color.

26. In hat construction, in combination, a felt hat body susceptible to one class of dyes and resistant to another class of dyes, and having at least a portion thereof covered with a loosely woven material through the interstices of which said hat body is visible, said material being susceptible to said second-mentioned class of dyes and resistant to said first-mentioned class of dyes, certain of the feltable fibers of the hat body extending through interstices in said material and over threads of the latter and having their otherwise free ends interfelted with other fibers of the hat body.

27. In hat construction, in combination, a felt hat body made of interfelted animal fibers, and having at least a portion thereof covered by an ornamental open-work material secured thereto only by fibers of the hat body.

28. In hat construction, in combination, a felt hat body made of interfelted animal fibers, and having at least a portion thereof covered by an open-work material, the threads of which are of non-animal fibers and which are secured to the felt hat body by animal fibers of the latter interfelted with the latter.

29. The herein described art of hat manufacture which consists in forming a hat bat of feltable fibers, subjecting the hat bat to hardening treatment securing thereto a loosely woven material having interstices between the threads thereof by feltable fibers looped over the threads of said material and having their ends felted into the hat bat, controlling the number of looping feltable fibers by correspondingly varying the extent to which said hardening step is carried on, and giving the resultant hat body the shape of a hat.

30. The herein described art of hat manufacture which consists in placing on a substantially flat substantially triangular shaped form a hat body comprising a substantially cone-shaped hat bat made of feltable fibers and an open-work material having interstices between the threads thereof, causing certain of the feltable fibers of the hat bat to be worked through said interstices and to become interfelted with others of the feltable fibers by subjecting the hat body with the said form fitted therein to treatment between two relatively vibrating surfaces, removing the hat body from said form, and shrinking the hat bat and simultaneously contracting said material.

31. The herein described art of hat manufacture which consists in placing on a substantially flat substantially triangular shaped form a hat body comprising a substantially cone-shaped hat bat made of feltable fibers and an open-work material having interstices between the threads thereof, causing certain of the feltable fibers of the hat bat to be worked through said interstices and to become interfelted with others of the feltable fibers by subjecting the hat body with the said form fitted therein to treatment between two relatively vibrating surfaces, then shrinking the hat body, and giving the hat body the shape of a hat.

32. The herein described art of hat manufacture which consists in placing on a substantially flat substantially triangular shaped form a hat body comprising a substantially cone-shaped hat bat made of feltable fibers and an open-work material having interstices between the threads thereof, causing certain of the feltable fibers of the hat bat to be worked through said interstices and to become interfelted with others of the feltable fibers by subjecting the hat body with the said form therein to vibration under pressure, and then shrinking the hat body.

33. The herein described art of hat manufacture which consists in placing a cone-shaped hat bat made of feltable fibers upon a substantially flat substantially triangular shaped form, applying to the hat bat while on the form a loosely woven material, and causing certain of the feltable fibers of the hat bat to be worked through interstices in said material and to become interfelted with others of the feltable fibers by subjecting the resultant hat body while on the form to vibratory action under pressure.

34. The herein described art of hat manufacture which consists in placing a cone-shaped hat bat made of feltable fibers upon a substantially flat substantially triangular shaped form, applying to the hat bat while on the form a loosely woven material, working fibers from the hat bat through interstices in said material while both are still on the form, looping fibers over threads of said material and felting the otherwise free ends into the hat bat, and shrinking the resultant hat body.

35. The herein described art of hat manufacture which consists in placing a cone-shaped hat bat made of feltable fibers upon a substantially flat substantially triangular shaped form, wrapping a loosely woven material in strip form onto the hat bat while the latter is on said form, causing certain of the feltable fibers of the hat bat to be worked through interstices in said material and to become interfelted with others of the feltable fibers by placing the resultant assemblage between two relatively vibratable surfaces, removing the resultant hat body from said form, and giving it the shape of a hat.

36. The herein described art of hat manufacture which consists in placing a cone-shaped hat bat made of feltable fibers upon a substantially flat substantially triangular shaped form, wrapping a loosely woven material in strip form onto the hat bat while the latter is on said form, looping feltable fibers over threads of said material, and felting the ends of said looping fibers into the hat bat.

37. The herein described art of hat manufacture which consists in placing a cone-shaped hat bat made of feltable fibers upon a substantially flat substantially triangular shaped form, wrapping a loosely woven material in strip form onto the hat bat while the latter is on said form, subjecting the resultant assemblage to treatment to work fibers from said hat bat through interstices in said material and to cause said fibers to loop over threads of said material and to be interfelted with the fibers of the hat bat.

38. The herein described art of hat manufacture which consists in forming a layer of feltable fibers onto a cone-shaped support, removing the resultant hat bat from the support, subjecting the hat bat to hardening treatment, inserting into the hat bat a substantially flat substantially triangular shaped form, relating to the hat bat an open-work material, tying said material to the hat bat by feltable fibers interfelted with the hat bat, and controlling the character of the tying action of said interfelted feltable fibers by correspondingly varying the extent to which said hat bat is subjected to said hardening treatment.

39. The herein described art of hat manufacture which consists in forming a layer of feltable fibers onto a cone-shaped support, removing the resultant hat bat from the support, inserting into the hat bat a substantially flat substantially triangular shaped form, relating to the hat bat an open-work material, subjecting the resultant assemblage to treatment to cause fibers of the hat bat to tie the threads of said material to the hat bat, and shrinking the resultant hat body.

40. The herein described art of hat manufacture which consists in forming a hat bat out of a layer of feltable fibers, partially hardening the hat bat, relating thereto a loosely woven material, made of fibers incapable of interfelting with said feltable fibers, and simultaneously completing the hardening of the hat bat and causing fibers of the hat bat to secure said material thereto.

41. The herein described art of hat manufacture which consists in subjecting a hat bat made of feltable fibers to hardening treatment, relating thereto a material having interstices between the threads thereof and the fibers of whose threads are incapable of interfelting with said feltable fibers, working the resultant assemblage to cause feltable fibers of the hat bat to work through interstices in said material and over the threads of the latter and to become interfelted with fibers of said hat bat, thereby to secure said material to the hat bat, controlling the number of fibers made available for securing action by varying the extent to which said hardening treatment is carried on, shrinking the resultant hat body, and giving the latter the shape of a hat.

42. The herein described art of hat manufacture which consists in subjecting a hat bat made of feltable fibers to hardening treatment, relating thereto a material having interstices between the threads thereof and the fibers of whose threads are incapable of interfelting with said feltable fibers, working the resultant assemblage to cause feltable fibers of the hat bat to work through interstices in said material and over the threads of the latter and to become interfelted with fibers of said hat bat, thereby to secure said material to the hat bat, controlling the number of fibers made available for securing action by varying the extent to which said hardening treatment is carried on, subjecting the resultant hat body to further hardening treatment, and then shrinking the hat body.

43. The herein described art of hat manufacture which consists in subjecting a hat bat made of feltable fibers to hardening treatment, relating thereto a material having interstices between the threads thereof and the fibers of whose threads are incapable of interfelting with said feltable fibers, causing feltable fibers to loop over the threads of said material and to become interfelted at their ends with the hat bat by subjecting the resultant assemblage to vibratory treatment under the influence of heat and moisture, controlling the number of looping fibers by appropriately varying the extent to which said hardening treatment is carried on, and then shrinking the resultant hat body.

44. The herein described art of hat manufacture which consists in subjecting a hat bat made of feltable fibers to hardening treatment, relating thereto a material having interstices between the threads thereof and the fibers of whose threads are incapable of interfelting with said feltable fibers, working the resultant assemblage to work feltable fibers from said hat bat through interstices in said material and to cause the otherwise free ends thereof to become interfelted over the threads of said material, thereby to secure the later to said hat bat, and controlling the number of securing fibers worked up through said interstices by appropriately varying the extent to which said hardening treatment is carried on.

In testimony whereof, I have signed my name to this specification this 10th day of March, 1931.

FRANK H. LEE.